Feb. 20, 1940. G. SYKES 2,190,955
FRESH FRUIT PACK EXTENSION AND LINER
Filed Dec. 7, 1938
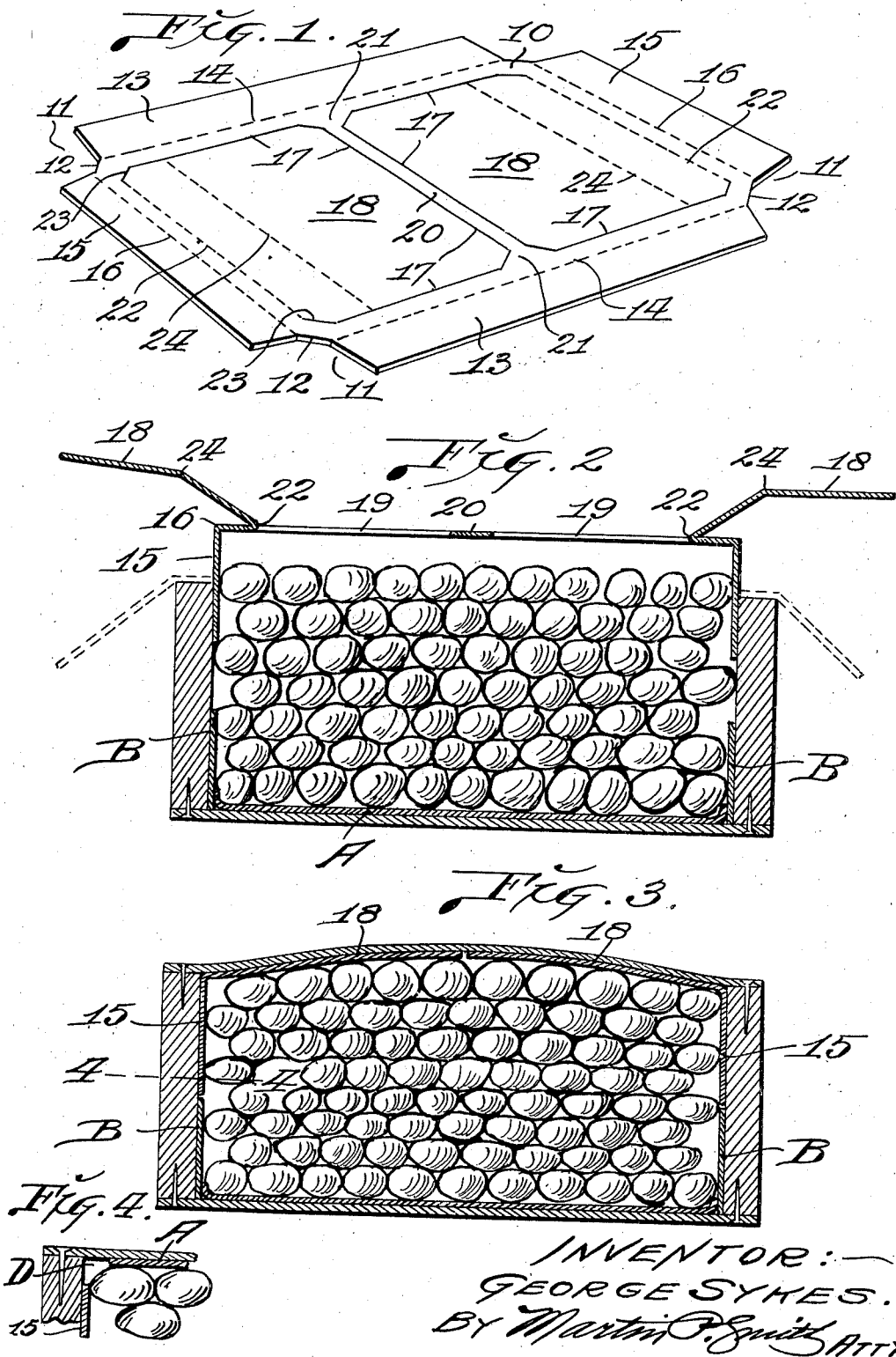

Patented Feb. 20, 1940

2,190,955

UNITED STATES PATENT OFFICE 2,190,955

FRESH FRUIT PACK EXTENSION AND LINER

George Sykes, Los Angeles, Calif.

Application December 7, 1938, Serial No. 244,416

8 Claims. (Cl. 217—3)

My invention relates generally to the packing of fresh fruits in boxes and like containers and more particularly to means in the form of a liner for the upper portion of the container, the use of which liner enables fruit to be packed higher than the top of the container so that when the body of fruit of extended height is pressed downwardly into the container and the lid is secured thereto, the individual fruits will rigidly contact one another to such a degree as to effectually prevent the individual fruits from jiggling and rubbing against each other and, in the event of shrinkage the individual fruits will still remain rigid and in contact with each other during transportation from the packing house to the retail market.

While my invention is particularly adapted for the packing of relatively small fruit such as grapes, plums, apricots, and the like, it is equally advantageous in the packing of larger fruit such as apples, peaches, pears, oranges, and the like.

One of the objects of my invention is, to provide a combined liner and wall extension member that is adapted to be positioned in the upper portion of the box or container and to extend a substantial distance above the upper edges of the walls of the container, thus providing additional space above the chamber within the box and which space may receive one or more layers or tiers of fruit so that, when the entire body of fruit is pressed downwardly into the box or container the individual fruits make contact with each other under pressure, thereby holding said fruits firmly in packed position which is of decided advantage, particularly where the packed fruit is transported for a considerable distance from the packing house to the retail market.

Small fruit such as grapes, plums, apricots, and the smaller sizes of pears, apples, peaches, and the like, are generally spheroidal or ellipsoidal in shape and as a result, when the individual fruits are packed, they present a considerably greater number of tangents or points of contact between the individual fruits than the larger fruits that are more nearly spherical in shape.

My invention provides for the packing of one or more tiers or layers of the smaller irregular shaped fruits on top of the body of fruit that completely fills the box or container so that the plane occupied by the top of the packed fruit is substantially higher than the upper edges of the walls of the box. Thus when the cover is applied to the box and the same is pressed downward before being nailed to the box, the entire body of fruit is compressed to such a degree as to cause the individual fruits to contact each other with sufficient pressure to firmly hold the same in practically rigid condition and thereby preventing jiggling and rubbing of the individual fruits during transportation.

It is one of the principal objects of my invention, to provide a combined liner and vertically adjustable box wall extension that is formed from a single piece of light weight material, such as cardboard, and to construct the same so that it may be readily applied inside the upper portion of the box or container so as to project a substantial distance above the upper edges of the walls of the box, thereby providing temporary retaining walls and structure that enable one or more tiers or layers of fruit to be packed on top of the body of fruit that fills the box and prevent the added fruit from rolling or dropping over the upper ends of the walls of the box while being packed or conveyed to the nailing press. When pressure is applied to the body of fruit, the wall extension member is forced downwardly into the box to function as a liner between the upper portion of the body of fruit and the corresponding portions of the walls of the box and also a liner between the top of the body of fruit and the cover that is secured to the box after the pressure has been applied to the contained fruit.

A further object of my invention is, to provide a liner and wall extension of the character referred to, that is constructed so as to maintain its shape when inserted in the upper portion of the box and, portions of the liner and extension member being cut to form flaps that may be folded endwardly while the additional tiers or layers of fruit are being packed and which flaps are subsequently folded over on to the top of the body of fruit in the box, so as to serve as a liner for the entire under surface of the box cover.

A further object of my invention is, to construct the corners of the liner and wall extension member so that the same may be readily inserted into the upper portion of the box without binding and for the purpose of providing vertically disposed air circulation ducts that extend throughout the height of the box, in the corners thereof.

With the foregoing and other objects in view, my invention consists in certain novel features of construction and arrangement of parts that will be hereinafter more fully described and claimed and illustrated in the accompanying drawing in which:

Fig. 1 is a perspective view of my improved packing box wall extension and liner.

Fig. 2 is a vertical section taken lengthwise through the center of a packing box and showing my improved liner and wall extension member positioned in the upper portion of the box so as to enable the additional tiers or layers of fruit to be packed.

Fig. 3 is a vertical longitudinal section similar to Fig. 2 and showing the position of the liner and wall extension member after the lid or cover has been nailed on to the box.

Fig. 4 is a detail section taken on the line 4—4 of Fig. 3.

Referring by numerals to the accompanying drawing which illustrates a preferred embodiment of my invention, 10 designates a substantially rectangular sheet of thin material such as cardboard, having a certain degree of flexibility and yet of sufficient stability to prevent collapse while being inserted in the upper portion of a packing box. Portions at the corners of this sheet of material are cut away to form substantially rectangular notches 11 and the central portions 12 of the edges of the material formed by said notches occupy positions that are inclined approximately ninety degrees relative to the side and end edges of the member 10.

By providing the straight inclined edges 12 at the inner corners of the notches 11, the ends of the marginal portions of the sheet between the notches 11 and which constitute side and end flaps, the ends of the latter when folded at right angles to the main body portion of the sheet and the liner is inserted in a packing box, are spaced a slight distance apart, such spacing being illustrated in Fig. 4.

The narrow strips of material along the sides of the sheet 10 between the notches 11 constitute side flaps 13 that are adapted to be folded downwardly at right angles to the plane occupied by the main body of the sheet when the liner and extension member is inserted in the upper portion of the box and, to facilitate this folding the sheet is scored along the lines 14 and which latter are parallel with and inset from the outer edges of the flap members.

Likewise the narrow portions at the ends of the sheet between the notches 11 constitute end flaps 15 that are adapted to be folded downwardly at right angles to the sheet when the device is positioned in the box and these end flaps are foldable along scored lines 16 that are parallel with and inset from the end edges of the sheet.

The ends of the scored lines 16 that define the lines of fold of the end flaps 15, and the ends of the scored lines 14 that define the lines of fold for the side flaps 13, terminate at the ends of the inclined edges 12 at the inner ends of notches 11.

That portion of the sheet 10 inside the scored lines 14 and 16 is cut along the lines 17 to form a pair of substantially rectangular flaps 18 that are adapted to be folded upwardly and outwardly when the device is inserted in the box, thus producing a pair of relatively large openings 19 in the sheet through which the additional and final tiers or layers of fruit are packed into the box on top of the body of fruit that practically fills said box. The inner edges of the flaps 18 are separated by a centrally arranged transversely disposed strip 20 that functions as a tie between the central portions of the sides of the device and, to counteract tendency of the ends of this tie to tear or break away from the side portions of the device, said ends that join the sides of the sheet 10 are widened as designated by 21.

In order that the flaps 18 may be swung upwardly and outwardly into the positions illustrated in Fig. 2 to enable the final layers or tiers of fruit to be packed in the box, transversely disposed scored lines 22 are provided and these scored lines occupy positions parallel with and inset slightly from the scored lines 16 at the ends of the sheet. Between the ends of the scored lines 22 and the slots formed in the sheet to define the side edges of the flaps 18, short diagonally disposed slits 23 extend from the outer ends of the slits 17 to the ends of the scored lines 22 and which slits 23 are parallel with the diagonal edges 12 in the central portions of the notches 11.

The material forming the flaps 18 is scored transversely as designated by 24 along transverse lines that are parallel with and inset from the scored lines 22, thus enabling the flaps 18 to "break" or bend along said scored lines 24 when said flaps are swung upwardly and outwardly as illustrated in Fig. 2.

These scored lines 24 are disposed, so that when the combined liner and extension member is first positioned in the box and before it is elevated, the portions of the flaps 18 between the scored lines 16 and 24 will rest on the upper edges of the end walls of the box as illustrated by dotted lines in Fig. 2, thus supporting the liner and extension wall member while the space within the box is being filled or packed with fruit.

In the use of my improved liner and extension wall member, a liner A of cardboard or the like is placed on the bottom of the box with the end portions of said bottom liner extending part way up the side walls of the box.

End liners B are now positioned within the box against the lower portions of the inner faces of the side walls and to retain said end liners in position, the ends of the bottom liner A are bent upward so as to lie against the lower inner faces of said end liners. The combined liner and extension wall member may be positioned in the upper portion of the box before any of the fruit is packed thereon or, it may be positioned in the box after the same has been filled with fruit, with the upper tier or layer occupying a plane coincident with or just below the plane occupied by the upper edges of the walls of the box.

When placed in the box before the packing operation is begun, the flaps 13 and 15 are folded downwardly so as to lie against the inner faces of the side and end walls of the box with the portions of the sheet between the side and end flaps and the side edges and outer ends of the central flaps 18 resting on top of the side and end walls of the box.

Fruit is now packed in the box to practically fill the same or until the top layer or tier is practically level with the upper edges of the walls of the box. The extension wall member and liner is now elevated to the position illustrated in Fig. 2, thus providing an enclosed space above the upper edges of the walls of the box and which space receives the added tiers or layers of the fruit. Thus the packing of the added tiers or layers of fruit is greatly facilitated and such added fruit is confined in the space above the body of the fruit that fills the box and prevents such added fruit from rolling or falling off the top of the pack.

After the added layers or tiers of fruit have been packed in the space within the extension walls formed by the vertically disposed flaps 13 and 15, the flaps 18 are folded upwardly and inwardly on to the top of the body of fruit and the box now passes to the machine that compresses the body of fruit and applies and secures the cover to the box.

As the body of fruit is compressed by the machine, the extension wall member and liner will be forced downwardly with that portion of the fruit in the upper part of the box so that finally the lower edges of the flaps 13 and 15 will be positioned immediately adjacent the upper edges of the side and end liners A and B.

When the cover has been secured in position on the box, the flaps 18 constitute a liner between the under side of the cover and the upper layer or tier of fruit.

The provision of the intermediate diagonal edges 12 at the corners of the sheet spaces the ends of the flaps 13 and 15 apart from each other so that the combined extension wall member and liner may be readily moved downward into the box without binding at the corners and, the notching or cutting away of the corners of the sheet is also effective in producing vertically disposed air circulation ducts D in the corners of the box (see Fig. 4).

Thus it will be seen that I have provided a combined liner and extension wall member for fruit packing boxes or containers that is relatively simple in construction, inexpensive of manufacture and very effective in performing the functions for which it is intended.

It will be understood that minor changes in the size, form and construction of the various parts of my improved fresh fruit pack extension and liner, may be made and substituted for those herein shown and described, without departing from the spirit of my invention, the scope of which is set forth in the appended claims.

I claim as my invention:

1. A combined liner and wall extension member for fruit packing boxes comprising a sheet of thin material, the corners of which are cut away to form notches having straight edges at their inner ends, which straight inner edges are inclined substantially forty-five degrees relative to the side and end edges of the sheet, the portions of the sheet between the sides of said notches constituting side and end flaps, the sheet of material being scored along lines parallel with its side and end edges so as to define the lines of fold for said side and end flaps, the ends of which scored lines terminate at the ends of the straight inclined edges at the inner ends of said notches and that portion of the sheet within said side and end flaps being cut to form a pair of flaps that are adapted to be opened upwardly and outwardly.

2. A combined liner and wall extension member as set forth in claim 1, with a tie strip connecting the central portions of the side flaps and arranged between the inner edges of said central flaps.

3. A fresh fruit pack extension and liner comprising a section of thin sheet material, the corners of which are cut away to form notches, the side portions of the sheet of material between said notches constituting side flaps, the end portions of the sheet of material between the notches constituting end flaps, the sheet of material being scored along lines parallel with the edges of the side and end flaps to define the lines on which said flaps may be bent, said notches being formed with straight edges at their inner ends, the ends of which straight edges terminate at the ends of said scored lines so that when the side and end flaps are folded upwardly with respect to the main body portion of the sheet, the ends of said side and end flaps are spaced apart and a pair of upwardly and endwardly opening flaps cut from that portion of the sheet of material within said side and end flaps.

4. A fresh fruit pack extension and liner as set forth in claim 3, with a transverse tie connecting the central portions of the side flaps and disposed between the inner edges of the flaps that are cut from the central portion of the sheet.

5. A fresh fruit pack extension and liner as set forth in claim 3 and said sheet of material being scored on transverse lines adjacent and parallel with the end flaps to define the lines on which the flaps that are cut from the central portion of the sheet may fold.

6. As a new article of manufacture, a fresh fruit pack extension and liner formed from a single piece of sheet material and comprising vertically disposed walls that are adapted to be positioned in the upper portion of a fruit packing box, a section of the thin sheet material connecting the upper edges of said walls and adapted to provide a liner for the under side of the cover of the box to which the extension and liner is applied, the length of the walls on the sides of the sheet of material from which the liner is formed being less than that portion of the material that connects the upper edges of said walls, the length of the walls at the ends of the sheet being less than the width of that portion of the sheet that connects said walls so that when the walls are folded at right angles to the connecting portion of the sheet, the ends of said walls are spaced apart and the sheet of material that connects said walls being cut to form an opening and a flap which normally closes said opening.

7. As a new article of manufacture, a fresh fruit pack extension and liner formed from a single piece of sheet material and comprising vertically disposed walls that are adapted to be positioned in the upper portion of a fruit packing box, a section of the thin sheet material connecting the upper edges of said walls and adapted to provide a liner for the under side of the cover of the box to which the extension and liner is applied, the length of the walls on the sides of the sheet of material from which the liner is formed being less than that portion of the material that connects the upper edges of said walls, the length of the walls at the ends of the sheet being less than the width of that portion of the sheet that connects said walls so that when the walls are folded at right angles to the connecting portion of the sheet, the ends of said walls are spaced apart and the sheet of material that connects said walls being cut to form a pair of openings and flaps for normally closing said openings.

8. As a new article of manufacture, a fresh fruit pack extension and liner formed from a single piece of sheet material and comprising vertically disposed walls that are adapted to be positioned in the upper portion of a fruit packing box, a section of the thin sheet material connecting the upper edges of said walls and adapted to provide a liner for the under side of the cover of the box to which the extension and liner is applied, the length of the walls on the sides of the sheet of material from which the liner is formed being less than that portion of the material that connects the upper edges of said walls, the length of the walls at the ends of the sheet being less than the width of that portion of the sheet that connects said walls so that when the walls are folded at right angles to the connecting portion of the sheet, the ends of said walls are spaced apart, the sheet of material that connects said walls being cut to form a pair of openings and flaps for normally closing said openings and a transverse tie arranged between said openings and connecting the side portions of said extension and liner.

GEORGE SYKES.